United States Patent
Vij et al.

(10) Patent No.: US 7,640,543 B2
(45) Date of Patent: Dec. 29, 2009

(54) MEMORY ISOLATION AND VIRTUALIZATION AMONG VIRTUAL MACHINES

(75) Inventors: Mona Vij, Portland, OR (US); Carlos V. Rozas, Portland, OR (US); Kumar Ranganathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1182 days.

(21) Appl. No.: 10/881,847

(22) Filed: Jun. 30, 2004

(65) Prior Publication Data

US 2006/0004944 A1    Jan. 5, 2006

(51) Int. Cl.
*G06F 9/455* (2006.01)
*G06F 21/00* (2006.01)
*G06F 13/28* (2006.01)

(52) U.S. Cl. .................. 718/1; 711/6; 711/152
(58) Field of Classification Search ............. 718/1; 711/6, 152
See application file for complete search history.

(56) References Cited

U.S. PATENT DOCUMENTS

| | | | |
|---|---|---|---|
| 4,787,031 A * | 11/1988 | Karger et al. | 718/100 |
| 5,459,869 A | 10/1995 | Spilo | |
| 6,397,242 B1 | 5/2002 | Devine et al. | |
| 6,496,847 B1 | 12/2002 | Bugnion et al. | |
| 6,704,925 B1 | 3/2004 | Bugnion | |
| 7,111,146 B1 | 9/2006 | Anvin | |
| 2005/0091365 A1 * | 4/2005 | Lowell et al. | 709/224 |

OTHER PUBLICATIONS

Cox, Richard, "A Virtual Memory Management Unit for Denali", Intel Research Seattle,(Oct. 16, 2002).
Intel, "Twenty-to-One Consolidation on Intel Architecture", (Feb. 2002).
Munro, Jay , "Virtual Machines & VMware, Part I", Copyright (c) Ziff Media Inc.,(2001).
Office Action for U.S. Appl. No. 10/814,218 Mailed Sep. 20, 2007.
U.S. Appl. No. 10/814,216 Office Action mailed Dec. 22, 2008.

* cited by examiner

*Primary Examiner*—Meng-Ai An
*Assistant Examiner*—Camquy Truong
(74) *Attorney, Agent, or Firm*—Blakely, Sokoloff, Taylor & Zafman LLP

(57) ABSTRACT

Disclosed is a virtual machine monitor (VMM) that controls access to a page table hierarchy by a guest operating system (OS). For example, the guest operating system may operate as part of a virtual machine. Particularly, the virtual machine monitor obtains control of memory access transactions responsive to the guest operating system attempting to access the page table hierarchy. More particularly, when the guest operating system attempts to access a page table, control of memory access transactions is trapped to the virtual machine monitor.

4 Claims, 7 Drawing Sheets

MEMORY ISOLATION AND VIRTUALIZATION AMONG VIRTUAL MACHINES

FIELD

Embodiments of the invention relate to memory isolation and virtualization among virtual machines, and in more particular embodiments, to memory isolation and virtualization among virtual machines in a protected execution environment.

DESCRIPTION OF RELATED ART

Advances in processors and communication technologies have opened up many opportunities for applications that go beyond the traditional ways of doing business. Electronic Commerce (E-Commerce) and Business-to-Business (B2B) transactions are now becoming more popular and are conducted throughout global markets at continuously increasing rates. Unfortunately, while modern computers provide users convenient and efficient methods of doing business, communicating and transacting, they are also vulnerable to attacks.

Examples of these types of attacks include virus, intrusion, security breach, and tampering, to name a few. These attacks, which are often deliberate, may interfere with the normal operation of the system, may destroy files and other important data, and/or may be used to surreptitiously gain access to classified information. Computer security, therefore, is becoming more and more important to protect the integrity of the computer systems and increase the trust of users.

There are an ever-increasing number of financial and personal transactions that are being performed on both local and remote computers, there is a correspondingly increased need for the establishment of trustable or secure environments. For example, private data like credit card data, medical report data, bank account data, or the like, stored on a computer to facilitate transactions, or even manage personal finances, may be accessed, corrupted or abused by another user of the same computer or by another networked computer via a Local Area Network (LAN), a Wide Area Network (WAN), or by system interconnections established through access to the Internet. Obviously, users do not want their private data made public, altered, or used in inappropriate transactions, regardless of whether the private data resides only on their personal computer or on a remote computer as a result of a transaction involving private data across a network.

Unfortunately, today, most security software is relatively independent of the hardware on which it is running and therefore cannot use hardware features to increase the level of protections. Thus, the level of protection may be completely dependent on the security software. However the security software itself is subject to software attack, and thus provides only limited protection.

Various secure operating environment methodologies have also been developed to try to address privacy of information issues. For example, typical existing secure operating environments are often designed to prevent the loss of privacy by utilizing isolated systems that may operate using a closed set of only trusted software. These systems, however, are disadvantageous to the extent that they do not allow the simultaneous use of common, commercially available operating system and application software.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Moreover, embodiments of the invention will be described in particular embodiments but may be implemented in hardware, software, firmware, middleware, or a combination thereof.

It should be noted that generally the terms computer system, processing system, computing system, computing device, computer, etc., refers to any sort of computing or networking device (e.g. computer, server, file server, application server, workstation, mainframe, network computer, laptop computer, mobile computing device, palm pilot, personal digital assistant, cell-phone, integrated circuit, fax machine, printer, copier, set-top box, etc.) that includes a processor, and/or a memory, and/or input/output devices, etc., or any sort of device, machine, or system capable of implementing instructions.

Figure 1:
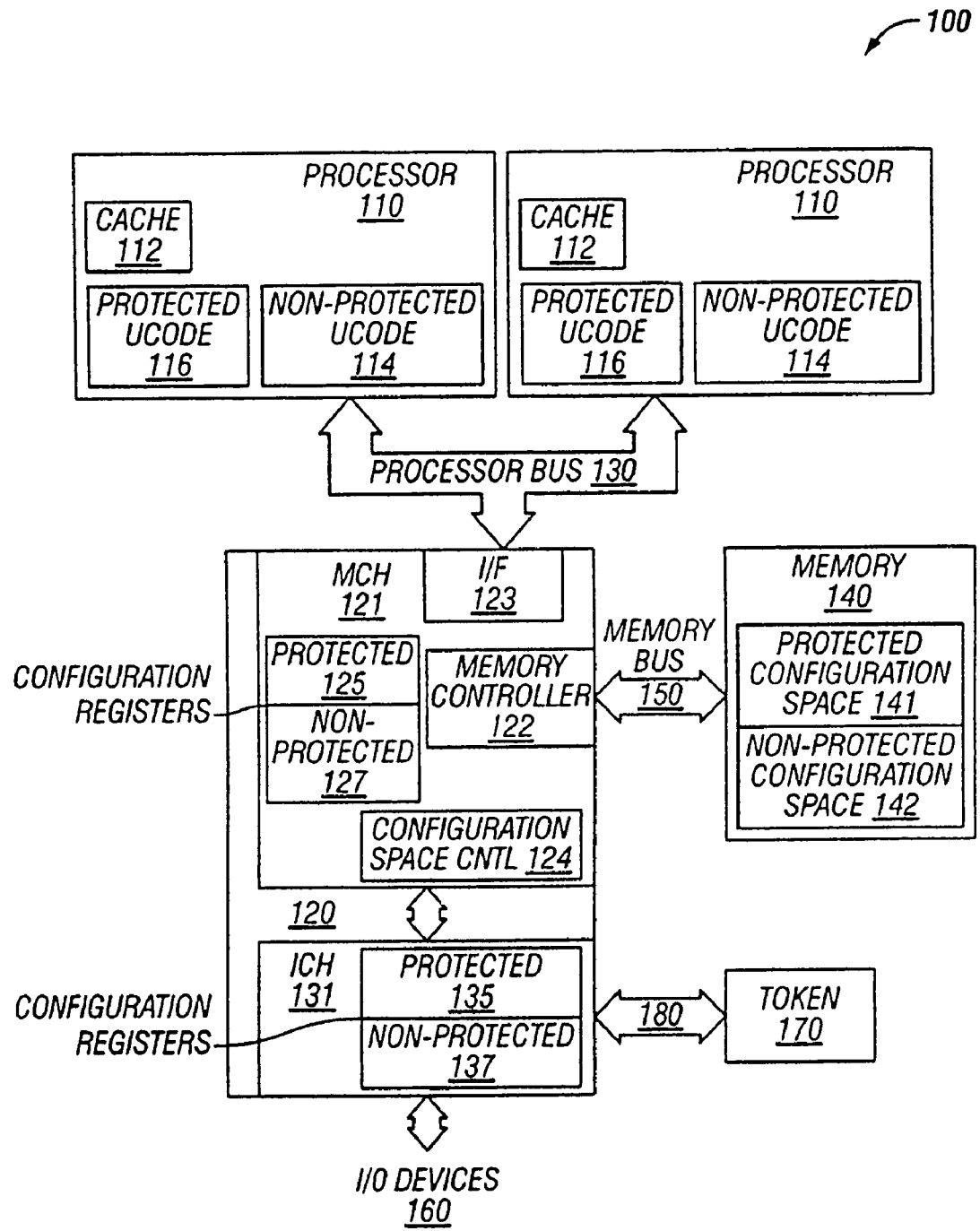
FIG. 1 shows a block diagram of a computing system, according to one embodiment of the invention.

FIG. 1 shows a block diagram of a computing system, according to one embodiment of the invention. Although FIG. 1 shows a particular configuration of system components, various embodiments of the invention may use other configurations. The illustrated system 100 includes one or more computing systems in the form of one or more processors 110 (two are shown in the illustrated embodiment, but one, three or more may be used), a memory 140, a logic circuit 120 coupled to the memory 140 through memory bus 150 and coupled to the processor(s) 110 through processor bus 130, input-output (I/O) devices 160, such as disk storage, and a token 170 coupled to the logic circuit 120 over bus 180.

Each processor 110 may include various elements, including any or all of: 1) cache memory 112, 2) non-protected microcode (uCode) 114, and 3) protected microcode 116. Microcode includes circuitry to generate operations and micro-operations in the execution of instructions, where instructions may include both program (software-implementable) operations and operations triggered by hardware events that may not be directly programmable. Protected microcode 116 includes microcode that may be executed only by protected instructions and/or as part of a protected operation. Non-protected microcode may be executed outside those restrictions.

Microcode that initiates a command over processor bus 130 may identify the command as a protected command in various ways, including but not limited to: 1) asserting one or more particular control lines on the bus, 2) placing a predetermined identifier on the bus, 3) placing predetermined data on the data lines, 4) placing a predetermined address on the address lines, 5) asserting certain signals with timing that is unique to protected commands, etc. While in one embodiment the protected microcode 116 is co-resident with the non-protected microcode 114, in another embodiment the protected microcode 116 is physically and/or logically separate from the non-protected microcode 114.

Memory 140 may include all of main memory. However, some of the potential address space that would potentially be accessed in memory 140 may be reserved for other purposes, and accesses to those reserved addresses may be redirected to other parts of the system. Configuration space may be reserved in this manner. Configuration "space" is a conceptual term that refers to the range(s) of addresses that are reserved for implementation in logic circuit 120 for various activities, with accesses that are targeted to any address within the configuration space being redirected to various portions of logic circuit 120 rather than to memory 140 or to input-output devices.

FIG. 1 shows protected configurations space 141 and non-protected configuration space 142, which represent the ranges of addressable locations that are reserved for control and monitoring activities (protected and non-protected activities, respectively) that are implemented in logic circuit 120. Configuration space may be implemented with addresses that would otherwise be part of memory address space or input-output (I/O) address space. Read or write commands to at least a portion of the addresses in the configurations space are redirected to configurations registers in logic circuit 120. In some embodiments, other portions of the addresses in the configurations space are used for commands that trigger some type of action within the logic circuit 120 rather than being used to store data in, or read data from, a register. In still another embodiment, commands directed to specific addresses in the configuration space may be temporarily placed in registers before being passed on to circuits external to logic circuit 120 (e.g., to token 170 over bus 180).

While in one embodiment one or both of the protected configuration space 141 and non-protected configuration space 142 contain only contiguous addresses, in another embodiment the addresses are not all contiguous. As used herein, the term "contiguous" may refer to contiguous in physical memory space or contiguous virtual memory space.

Logic circuit 120 may include various components, such as but not limited to: interface (I/F) 123 to decode the destination address of any command received over processor bus 130, memory controller 122 to control operations over memory bus 150, configuration registers 125, 127, 135 and 137, and configuration space control logic 124 to control operations within logic circuit 120. In one embodiment logic circuit 120 includes memory control hub (MCH) 121 and I/O control hub (ICH) 131, which may be implemented as separate integrated circuits. In an alternate embodiment, logic circuit 120 may be organized differently than shown in FIG. 1, and may be implemented within one or more integrated circuits in any suitable manner.

In one embodiment, I/F 123 may receive the commands seen on processor bus 130 and decode the destination addresses to determine how to respond. Configuration space control logic 124 may be used to convert some decoded addresses into the appropriate response. Such response may include, but is not limited to:

1) in response to the address being directed to another device on the processor bus 130, ignore the command,
2) in response to the address being directed to a viable location in memory 140, initiate the indicated read or write operation to memory 140 over memory bus 150,
3) in response to the address being directed to one of I/O devices 160, pass the command along to the I/O device over the appropriate bus,
4) in response to the address being directed to configuration space, determine which of the following actions is associated with that particular address and perform that action, that action being: a) perform the indicated read or write operation on the configuration register specified by the address, b) initiate a non-read/write action within logic circuit 120, c) send a read, write or other command to token 170 over bus 180 (in one embodiment, token 170 contains protected information associated with various cryptographic and/or validations processes), d) abort the command if the command indicates an operation that is not permitted.

Such impermissible operations may include but are not limited to: performing a non-protected operation in protected configuration space, performing a protected operation that is currently restricted, and performing a protected operation in an impermissible format. Aborting a command may take various forms, including but not limited to: timing out without responding, responding with an error code, responding with meaningless data (e.g., all 0=s or all 1=s), exiting the protected operational environment, and performing a system reset.

In one embodiment, the configuration registers include protected configuration registers 125, 135, and non-protected configuration registers 127, 137. Protected configuration registers may be used to control and monitor protected operations, and may be inaccessible to non-protected software and/or hardware, while non-protected configuration registers may be used for non-protected operations and may be accessible to non-protected hardware and/or software. In one embodiment, protected configuration registers may be implemented in physical registers that are physically and permanently distinct from non-protected registers. In another embodiment, one or more physical registers may be programmably designated as protected or non-protected at different times. In still another embodiment, one or more physical registers may be designated as both protected and non-protected, and be accessible by both protected and non-protected operations through different addresses.

In a particular embodiment, some configuration registers may be physically implemented in MCH 121 (e.g., configuration registers 125, 127, in FIG. 1), while other configuration registers may be physically implemented in ICH 131 (e.g., configuration registers 135, 137 in FIG. 1). Each group may include both protected (e.g., 125, 135) and non-protected (e.g., 127, 137) configuration registers. In such an embodiment, MCH 121 may pass on to ICH 131 any command directed to an address in configuration registers 135, 137 or that is otherwise implementable through ICH 131.

In one embodiment, logic circuit 120 may have a fuse, or its circuit equivalent, that may be blown at manufacturing time and is inaccessible after manufacturing, to disable (or alternately to enable) the operation of some or all of the protected configuration space, so that a single integrated circuit may be manufactured for both protected and non-protected applications, with the choice being a simple manufacturing operation rather than a circuit change.

In one embodiment, the configuration space is accessible only by processors 110, so that no other bus masters, I/O devices, or other internal devices are permitted to access the configuration space. Attempted commands to the configuration space by non-permitted devices may be handled in various ways, including but not limited to: 1) ignore the command, 2) return a default value such as all 0=s or all 1's in response to a read command, 3) return an error code, 4) generate a system interrupt, and 5) generate a system reset.

Non-protected configuration space may be accessed by commands initiated from non-protected microcode 114.

In one embodiment, protected configuration space may be accessed in either of two ways: 1) By issuing certain designated commands implemented through protected microcode 116. Commands issued to protected configuration space from non-protected microcode 114 will not succeed. 2) By issuing a command from protected microcode 116 that opens the protected configuration space to access by commands from non-protected microcode 114 and then executing the commands from non-protected microcode 114. A separate command from protected microcode 116 may close the protected configuration space to further access by commands from non-protected microcode 114.

In some embodiments, the specific ones of protected configuration registers 125, 127 may be further restricted from access. Such restrictions may include, but are not limited to: 1) permitting read access, but not write access by one or more particular processors 110, 2) restricting both read and write access by one or more particular processors 110, and 3) restricting modification of certain bits of the register.

In one embodiment, processors 110 may be prevented from caching any addresses within the protected configuration space 141. In another embodiment, processors 110 may be prevented from caching any addresses within both the protected configuration space 141 and the non-protected configuration space 142.

Each valid address within the configuration space 141, 142 may be mapped to various circuits, including but not limited to one or more of 1) a particular configuration register, 2) the logic to perform the associated internal action, and 3) another bus for passing the command on to a device external to logic circuit 120. In one embodiment, multiple addresses may be mapped to the same configuration register, internal action, or external bus. In one embodiment, an address in protected configuration space and an address in non-protected configuration space may be mapped to the same configuration register, internal action, or external bus. In a particular embodiment, one of two addresses that are mapped to the same configuration may be limited to a read operation, while the other address may not be so restricted.

In some embodiments, the mapping logic is included in configuration space control logic 124. In one embodiment, the mapping used may be hard-wired at the time of manufacture. In another embodiment, the mapping may be programmed into non-volatile memory. In still another embodiment, the mapping may be programmed into volatile memory when the system is initialized and/or when the protected operating environment is initialized.

As will be discussed, a virtual machine monitor (VMM) controls access to a page table hierarchy by a guest operating system (OS). The guest operating system operates as part of a virtual machine. In one embodiment, the virtual machine monitor operates in an area of protected memory. Particularly, the virtual machine monitor obtains control of memory access transactions responsive to the guest operating system attempting to access the page table hierarchy. More particularly, when the guest operating system attempts to access a page table, control of memory access transactions is trapped to the virtual machine monitor.

Figure 2:
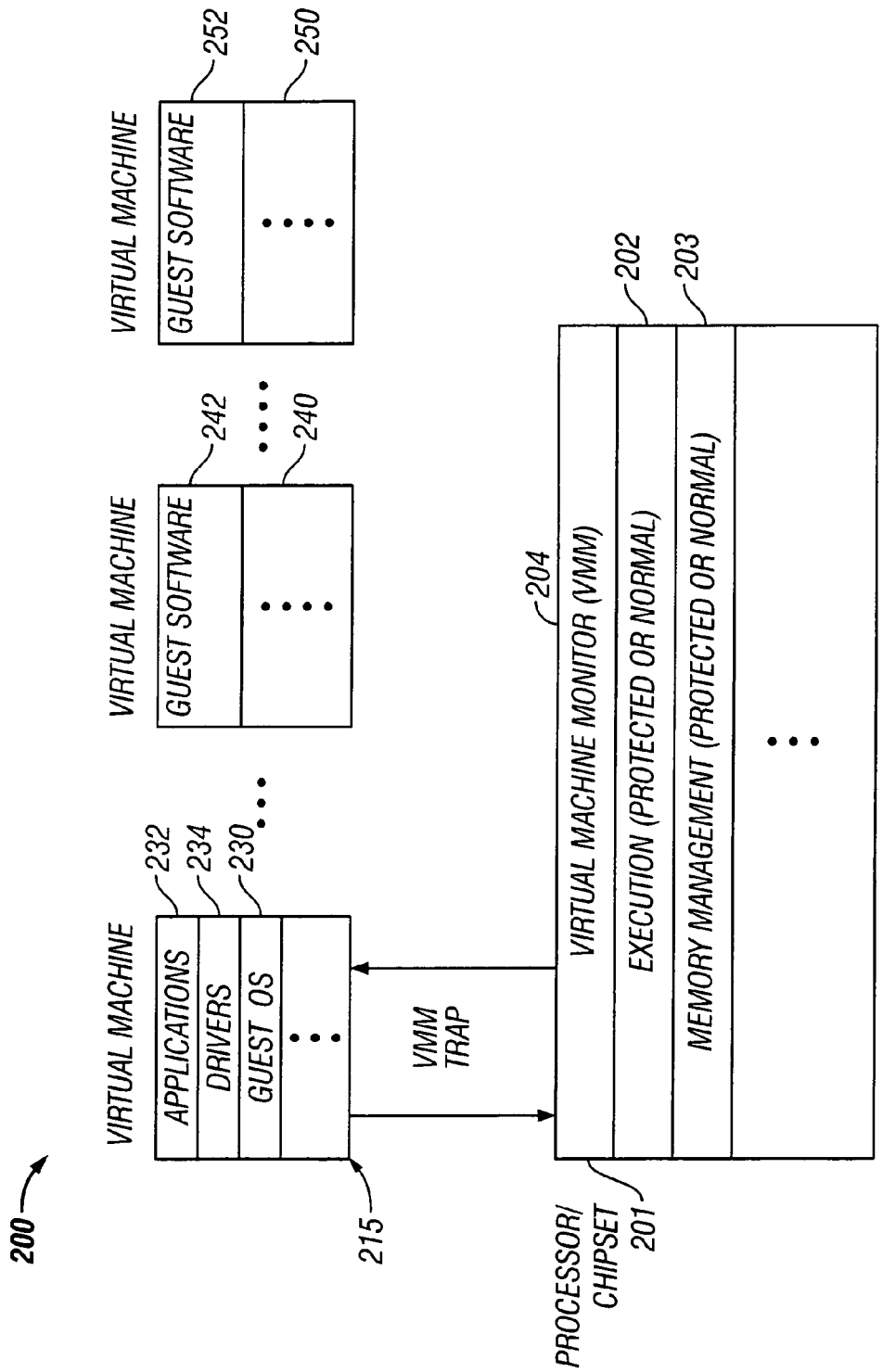
FIG. 2 shows a block diagram illustrating a virtual machine monitor (VMM) that provides for memory isolation and virtualization among virtual machines, according to one embodiment of the invention.

With reference to FIG. 2, FIG. 2 shows a block diagram 200 having a virtual machine monitor (VMM) 204 that provides for memory isolation and virtualization among virtual machines 215, 240, and 250, according to one embodiment of the invention. Memory isolation means that one virtual machine (VM) cannot access (e.g. read from or write to) another virtual machine's memory. Memory virtualization provides the illusion of a complete physical memory space for each virtual machine. In one embodiment, the guest operating system (OS) 230 of the first virtual machine 215 manages memory address translation and accesses for itself and the other virtual machines 240 and 250. Thus, the guest OS 230 acts on behalf of the other virtual machines. In one embodiment, the virtual machine monitor (VMM) 204 manages memory address access for all of the virtual machines (e.g. 215, 240, and 250).

According to embodiments of the invention, the virtual machine monitor (VMM) 204 protects accesses to page tables managed by the guest OS 230. More particularly, as will be described in more detail below, any page table write operations are intercepted by the virtual machine monitor (VMM) 204. Further, if guest physical addresses need to be re-mapped, the virtual machine monitor (VMM) 204 also intercepts guest page table read operations.

FIG. 2 illustrates a processor and/or chipset 201 that operates in either a normal execution mode or a protected execution mode. The protected execution mode may utilize virtual machine functionality and may create a protected execution environment, which operates utilizing protected microcode and protected memory, alone, or in conjunction with non-protected microcode instructions and non-protected memory, as previously discussed. Particularly, the processor and/or chipset 201 may implement protected execution functionality 202 and protected memory management functionality 203 by utilizing protected microcode instructions and protected configuration memory space, as previously described in detail. On the other hand, in the normal execution mode, protected microcode and protected memory are not utilized and the system operates utilizing non-protected microcode and non-protected memory (e.g. normal execution 202 and normal memory management 203).

The processor and/or chipset 201 implements virtual machine monitor 204 to enable a plurality of separate virtual machines 215, 240, and 250 to operate simultaneously and separately from one another. The separate virtual machines may simultaneously run guest software utilizing protected instructions and protected memory and, thus, may be trusted virtual machines. Alternatively, the separate virtual machines may run non-trusted guest software utilizing non-protected instructions and non-protected memory and, thus, may be non-trusted virtual machines.

For example, as shown in FIG. 2, a first virtual machine numeral 215 may be created by the virtual machine monitor 204 to implement guest software such as a guest operating system 230, applications 232, drivers 234, etc. Further, other virtual machines 240 and 250 operating other guest software 242 and 252, respectively, may also be created by virtual machine monitor 204

It should be appreciated that, in the protected execution mode, that any number of virtual machines each implementing trusted or non-trusted guest software respectively, utilizing protected instructions and protected memory or non-protected memory instructions and non-protected memory, respectively, may be created and utilized. Whereas, in the normal execution mode, only non-trusted virtual machines utilizing non-protected instruction functionality and non-protected memory can be utilized. Also, it should be appreciated that the previously described system allows for the simultaneous use of commonly used operating systems and software while in a protected execution environment.

In one embodiment, the virtual machine monitor 204 utilizes virtual machine extensions (VMX) in order to create the one or more virtual machines 215, 240, and 250, etc. For example, virtual machine extension instruction support is presently available in such processors as INTEL ARCHITECTURE (IA) 32-bit processors, as well as other commercially available processors.

The virtual machine monitor 204 provides support for creating and launching these multiple virtual machines 215, 240, and 250 and is used to aid in the control of these virtual machines. In one embodiment, the virtual machine monitor 204 operates in an area of protected memory. Alternatively, the virtual machine monitor 204 may operate in a non-protected memory area. The virtual machine monitor 204 controls areas of physical memory in order to ensure that the individual virtual machines are isolated and protected from one another and provides for full virtualization among a plurality of virtual machines.

The virtual machine monitor's 204 support for memory virtualization allows for the enforcement of virtual machine isolation and further supports the expectation that the guest OS 230, operating in the first virtual machine 215, manages memory address translation. The virtual machine monitor 204 restricts each of the virtual machines 215, 240, and 250 memory accesses to only their assigned subsets of memory. In one embodiment, the guest operating system (OS) 230 of the first virtual machine 215 manages memory address translation and accesses for itself and the other virtual machines 240 and 250. Thus, the guest OS 230 acts on behalf of the other virtual machines. Alternatively, the virtual machine monitor (VMM) 204 may manage all memory address translation and accesses for all the virtual machines (e.g. 215, 240, 250).

Linear address memory space may be mapped indirectly into a smaller physical memory and/or disk storage using paging. This method of mapping is commonly referred to as virtual memory or demand paged to virtual memory. When paging is used, the processor 201 divides the linear address space into fixed-size pages (e.g. 4 kilo-byte (KB), 2 mega-byte (MB), 4 MB, etc.) that can be mapped into physical memory and/or disk storage.

When a program (or task) references a logical address in memory, the processor 201 translates the address into a linear address and then uses a paging mechanism to translate the linear address into a corresponding physical address. If the page containing the address is not currently in physical memory, the processor 201 generates a page-fault exception. The exception handler for the page-fault exception typically directs the guest OS operating system 230 to load the page from disk storage into physical memory.

When the page has been loaded into memory, the return from the exception handler causes the instruction that generated the exception to be restarted. The information that the processor 201 uses to map linear addresses into physical memory address space and to generate page-fault exceptions (when necessary) is contained in page directories and page tables stored in memory. For example, the base address of the page directory is often stored in a register.

Embodiments of the invention for a virtual machine monitor 204 that provides for memory isolation and virtualization among virtual machines 215, 240, and 250 further provides mechanisms by which the virtual machine monitor 204 obtains control whenever a guest virtual machine (215, 240, or 250) tries to modify its page table hierarchy. Particularly, whenever a guest virtual machine (215, 240, or 250) through the guest OS 230 of the first virtual machine 215 tries to modify its page table hierarchy managed by the guest OS 230, it traps to the virtual machine monitor.

Figure 3:
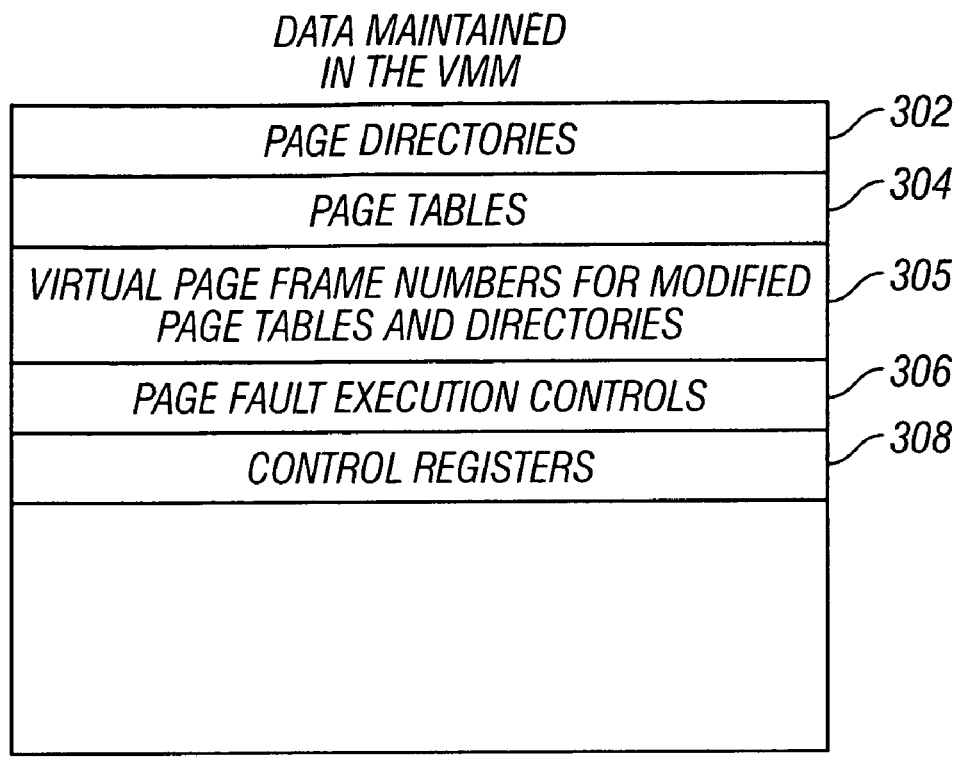
FIG. 3 shows a block diagram illustrating data maintained in the virtual machine monitor (VMM), according to one embodiment of the invention.

With additional reference to FIG. 3, FIG. 3 shows a block diagram illustrating data maintained in the virtual machine monitor, according to one embodiment of the invention. The virtual machine monitor 204 stores various values to aid the virtual machine monitor 204 in providing memory isolation and virtualization among virtual machines. Particularly, the transition from the guest OS 230 of the first virtual machine 215 to the virtual machine monitor 204 may be facilitated by the use of this data. It should be noted that the virtual machine monitor 204 may read and write fields into these fields using virtual machine read and write instructions.

As shown in FIG. 3, the virtual machine monitor 204 stores a listing of page directories 302, page tables 304, virtual page frame numbers for modified page tables and page directories 305, page fault execution controls 306, and control registers 308 used in describing the virtual machines 215, 240, and 250. These data fields may be used to determine what states are loaded and stored during transitions to and from the virtual machine monitor 204 to the guest OS 230 of the first virtual machine 215.

It should be noted that, as previously discussed, a wide variety of different protected modes having different levels of security may be defined by the processor 201. Generally, a protected mode is a state of settings for different processor registers that may include settings related to page directories 302, page tables 304, page-fault execution controls 306, and control registers (CR) 308 (e.g. CR0, CR1, CR2, CR3, CR4, etc.), which may also be stored in the virtual machine monitor 204. For example, in one embodiment, CR0 may define protected mode paging, CR2 may define virtual addresses, CR3 may define physical addresses of page tables, CR4 may define page faults, etc. It should be appreciated by those of skill in the art that a variety of different descriptors and controls may be used to define areas of memory.

Figure 4:
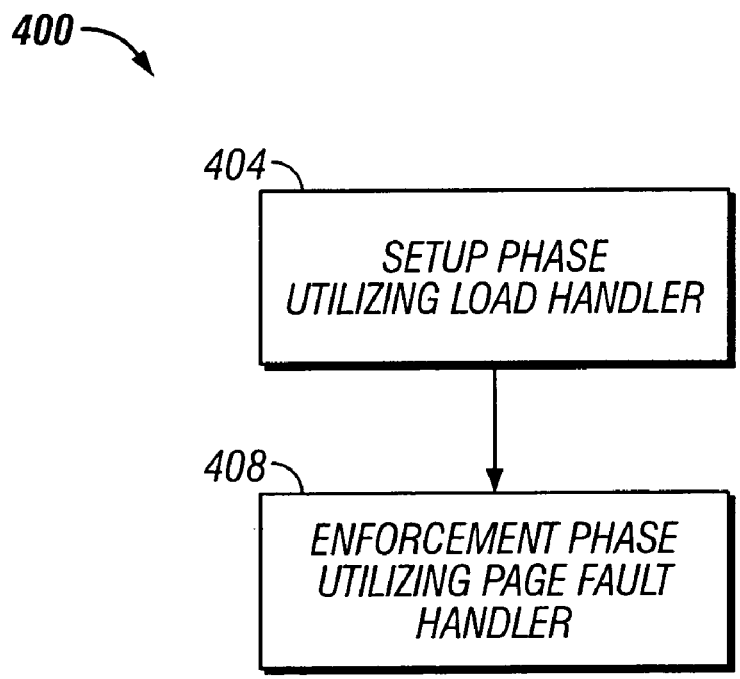
FIG. 4 shows a flow diagram illustrating a process by which the virtual machine monitor obtains control whenever the guest attempts to modify its page table hierarchy, according to one embodiment of the invention.

With reference to FIG. 4, FIG. 4 shows a flow diagram 400 illustrating a process by which the virtual machine monitor obtains control whenever the guest operating system (hereinafter guest) attempts to modify its page table hierarchy, according to one embodiment of the invention. For example, the guest may try to modify the physical addresses of memory associated with its page tables. The process includes two phases.

As shown in a flow diagram 400, at block 404, a setup phase utilizing a load handler is implemented, wherein the virtual machine monitor 204 parses and sets up appropriate flags in the page directory and page tables in order to gain control responsive to any modifications to the guest page table hierarchy. As previously discussed, the virtual machine monitor 204 may store listings of page directories 302 and page tables 304. Further, the virtual machine monitor 204 enforces a virtual machine separation policy to prevent any attempts from one guest virtual machine to access memory associated with another guest virtual machine (e.g., as between guest virtual machines 215, 240, or 250, as previously discussed).

In the setup phase (block 404), the virtual machine monitor 204 marks as "not present" all the entries in the guest's page directory 302 and page tables 304. The page directory and page tables provide the virtual to physical mappings of the guest's page directory and page table pages. In this way, any attempts by the guest to explicitly access (read/write) its own page directory or page tables will, as will be discussed, trap into the virtual machine monitor 204. The virtual machine monitor 204 only needs to obtain control on page faults caused by a read/write access of invalid entries in the guest page table hierarchy; all other page faults can be handled by the guest directly.

The enforcement phase utilizing the page fault handler (block 408) begins when the virtual machine monitor 204 obtains control on a page fault. The virtual machine monitor 204 then validates the page table/page directory updates made by the guest and generates a fault only if this is not a valid operation; otherwise the virtual machine monitor just emulates the operation for the guest and returns control to the guest.

Figure 5:
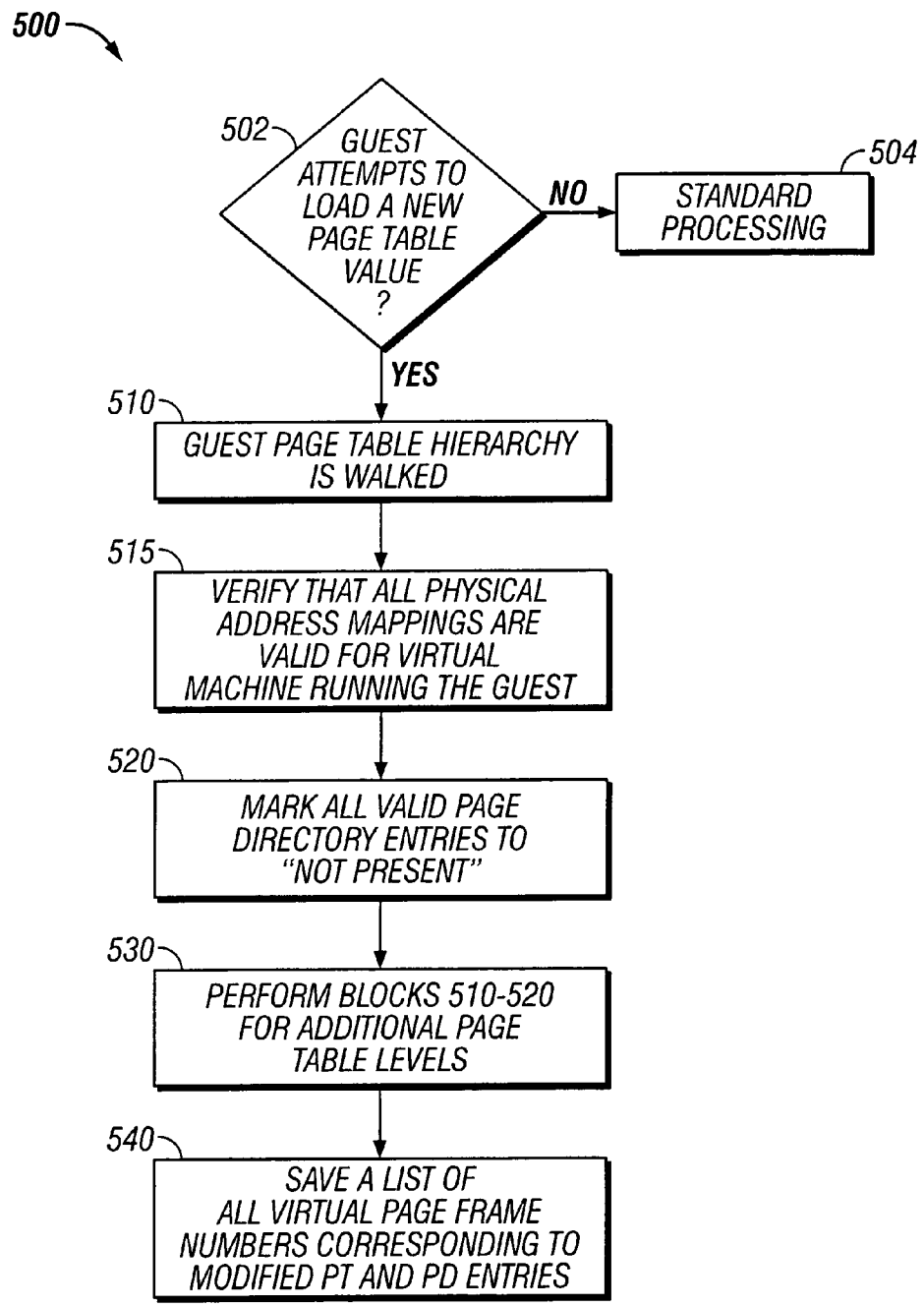
FIG. 5 shows a flow diagram illustrating the process associated with the setup phase utilizing a load handler in more detail, according to one embodiment of the invention.

With reference now to FIG. 5, FIG. 5 shows a flow diagram 500 illustrating the process associated with the setup phase utilizing a load handler in more detail, according to one embodiment of the invention. A load handler is invoked whenever a guest tries to load a new page table hierarchy by attempting to change a value associated with the physical addresses of page tables.

Particularly, at decision block 502, it is determined whether a guest has attempted to load a new page table value. If not, standard processing (block 504) is performed. However, if the guest has attempted to load a new page table value, then the guest page table hierarchy is walked by the virtual machine monitor 204 (block 510). Particularly, the virtual machine monitor 204 verifies that the physical address mappings are valid for the virtual machine running the guest (block 515). Additionally, the virtual machine monitor 204 may verify that the physical address mappings are valid for other virtual machines, as well.

For example, the virtual machine monitor 204 may walk the guest page directory and look for all valid page directory entries that point to the page directory itself. The virtual machine monitor 204 then marks each of these entries as "not present" or "invalid" (block 520) (e.g. Page Directory level 0 Invalid (PD0 INV), Page Table level 0 Invalid (PT0 INV)). This will ensure that all accesses to guest page directories and page tables through this mapping generate page faults that trap to the virtual machine monitor 204.

Further, because virtual to physical mappings to the page tables can be created via additional-level page tables as well, the virtual machine monitor 204 may repeat blocks 510-520 for any additional page table levels, and will walk these guest page table hierarchies to find all the valid mappings to the physical pages of these guest page directories and page tables and will mark them as "not present" or "invalid" as well (block 530) (e.g. Page Directory level 1 Invalid (PDI INV), Page Table level 1 Invalid (PTO INV, etc.)). Additionally, the virtual machine monitor 204 saves and maintains a list of all virtual page frame numbers corresponding to modified page table (PT) and page directory (PD) entries (block 540).

Figure 6:
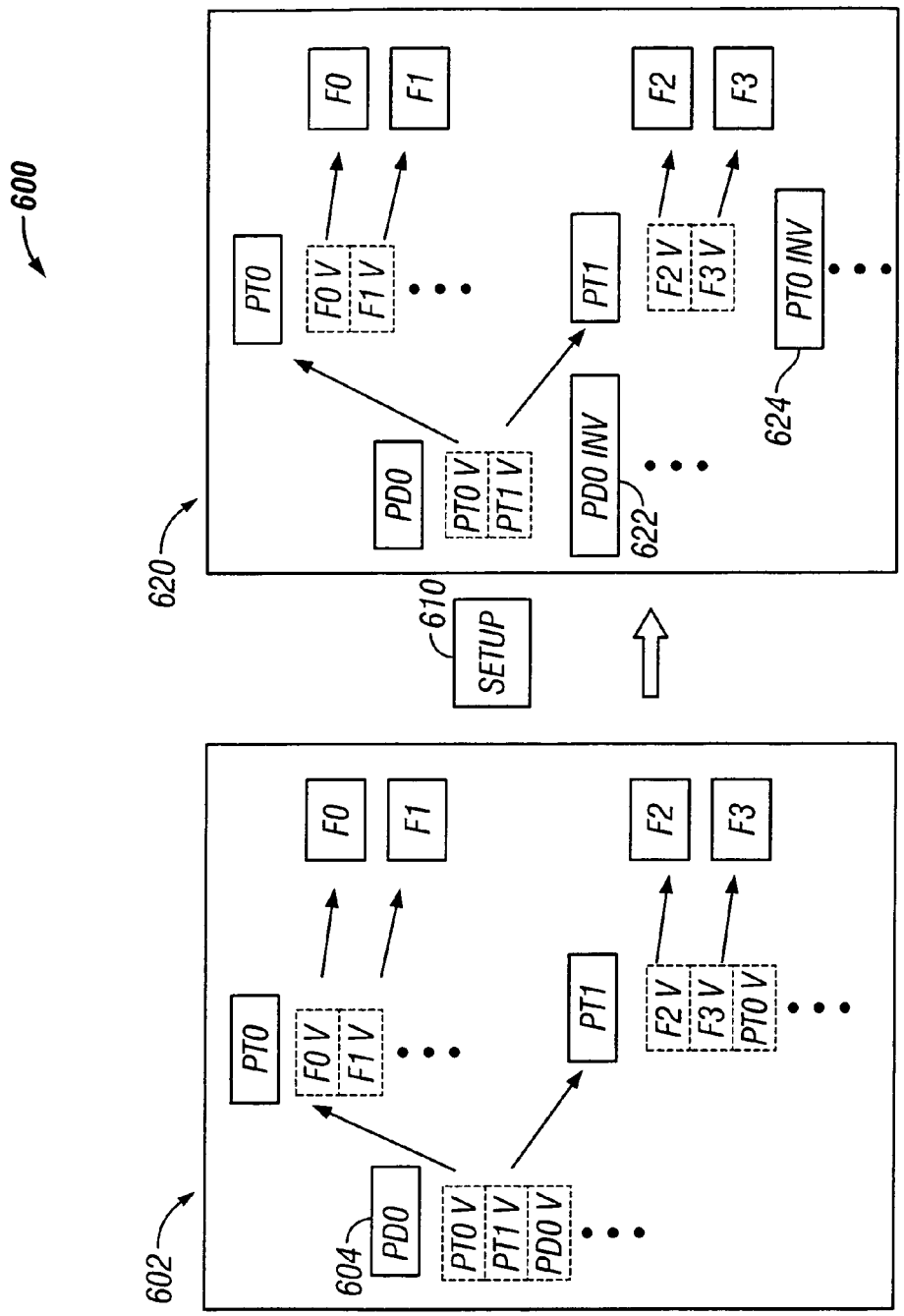
FIG. 6 shows a block diagram illustrating an example of a guest page table hierarchy undergoing the process associated with the setup phase utilizing the load handler.

An example of a guest page table hierarchy 600 will be now be discussed with reference to FIG. 6. For example, as shown in diagram 602, page directory level 0 (PD0) (604) includes page table zero and page table one (PT0 and PT1), along with associated frame numbers F0, F1, F2, and F3, respectively. It should be noted that PD0 and PT0 are all marked as valid (V). Page table hierarchy 620 undergoes the setup utilizing the load handler (610), as previously discussed, such that the appropriate page directories and page tables are marked as not present or invalid (INV). Looking at page table hierarchy diagram 620, after the setup utilizing the load handler, it can be seen that page directory level zero (PD0) is marked as invalid (INV) 622 and that page table level 0 (PT0) is also marked invalid (INV) 624.

The guest page table hierarchy also illustrates all of the various virtual page frame numbers denoted F0, F1, F2, F3, etc. The values for the page directories, page tables, frame numbers for modified page tables and page directories, etc., may be stored in the virtual machine monitor 204 in their respective storage areas: page directory storage area 302, page tables storage area 304, and virtual page frame numbers for modified page tables and page directories storage area 305.

Figure 7:
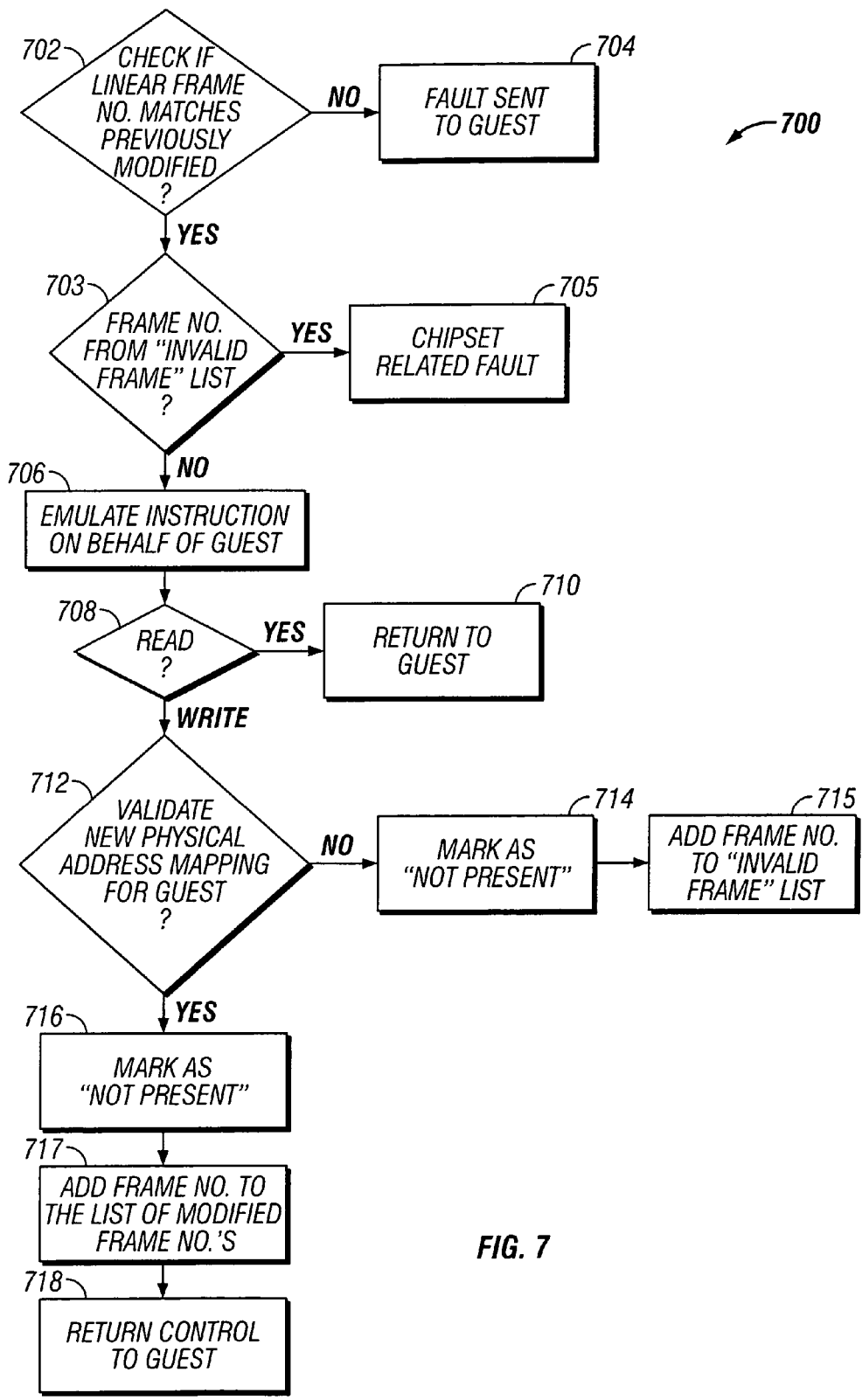
FIG. 7 shows a flow diagram illustrating the process associated with the enforcement phase utilizing a page fault handler in more detail, according to one embodiment of the invention.

With reference now to FIG. 7, FIG. 7 shows a flow diagram 700 illustrating the process associated with the enforcement phase utilizing the page fault handler in more detail, according to one embodiment of the invention. The page fault handler is invoked whenever the guest tries to access an invalid entry in the guest page table hierarchy. As previously discussed, the page fault handler is invoked by the virtual machine monitor 204 to validate page table/page directory updates made by the guest and generates a fault only if this is not a valid operation; otherwise the virtual machine monitor just emulates the operation for the guest and returns control to the guest.

Particularly, at block 702, the virtual machine monitor 204 checks if the faulting linear frame number matches any of the linear frame numbers modified by the virtual machine monitor in the setup phase. If not, the fault is sent back to the guest (block 704).

Next, at block 703, it is determined if the frame number is from an "Invalid Frames" list. If so, then a chipset related fault is caused (block 705) for accessing invalid memory and the fault is returned to the guest. On the other hand, if the frame number is not from the "Invalid List", and the page fault is due to the guest trying to access the modified page directory page table or page table page in the guest page table hierarchy, then the virtual machine monitor 204 emulates the instruction on behalf of the guest (block 706). If the attempt by the guest was a read access (block 708) and the entry read is not in the "Invalid Frames" list, then the process returns control back to the guest (block 710).

If the entry read is now in the "Invalid Frame" list, then a "Not Present" bit is simply flipped and the data is returned to the guest.

However, if the attempt by the guest was a write command, the virtual machine monitor performs the write command. Then the new physical address mapping is validated for that particular guest virtual machine by the virtual machine monitor 204 (block 712). If it is not a valid physical address (i.e. it is outside the bounds of physical memory), then the virtual machine monitor marks the entry as "not present" (block 714) and adds this frame number to the "Invalid Frames" list (block 715).

On the other hand, if the virtual machine monitor does determine that the new physical address mapping is valid for that particular guest machine, and if the physical address is for one of the physical pages for the page directories (PDs) or page tables (PTs) then these mappings are marked as "not present" or "invalid" (block 716). However, if the new physical address mapping is not for a page directory (PD) or a page table (PT), then the guest is simply returned to.

Otherwise the frame number is added to the list of modified frame numbers (block 717) and control is then returned to the guest (block 718). Thus, control is returned to the guest and the affected page directory and page tables are marked as invalid such that future accesses to these page tables and page directories will automatically trap back to the virtual machine monitor An example of a guest page table hierarchy 800 will be now be discussed with reference to FIG. 8. For example, as shown in diagram 620, as previously discussed after the setup by the load handler, page directory level zero (PD0) is marked as invalid (INV) 622 and page table level 0 (PT0) is also marked invalid (INV) 624. The guest page table hierarchy 620 also illustrates all of the various virtual page frame numbers denoted F0, F1, F2, F3, etc. Also, as previously discussed, the values for the page directories, page tables, frame numbers for modified page tables and page directories, etc., may be stored in the virtual machine monitor 204 in their respective storage areas: page directory storage area 302, page tables storage area 304, virtual page frame numbers for modified page tables and page directories storage area 305.

Figure 8:
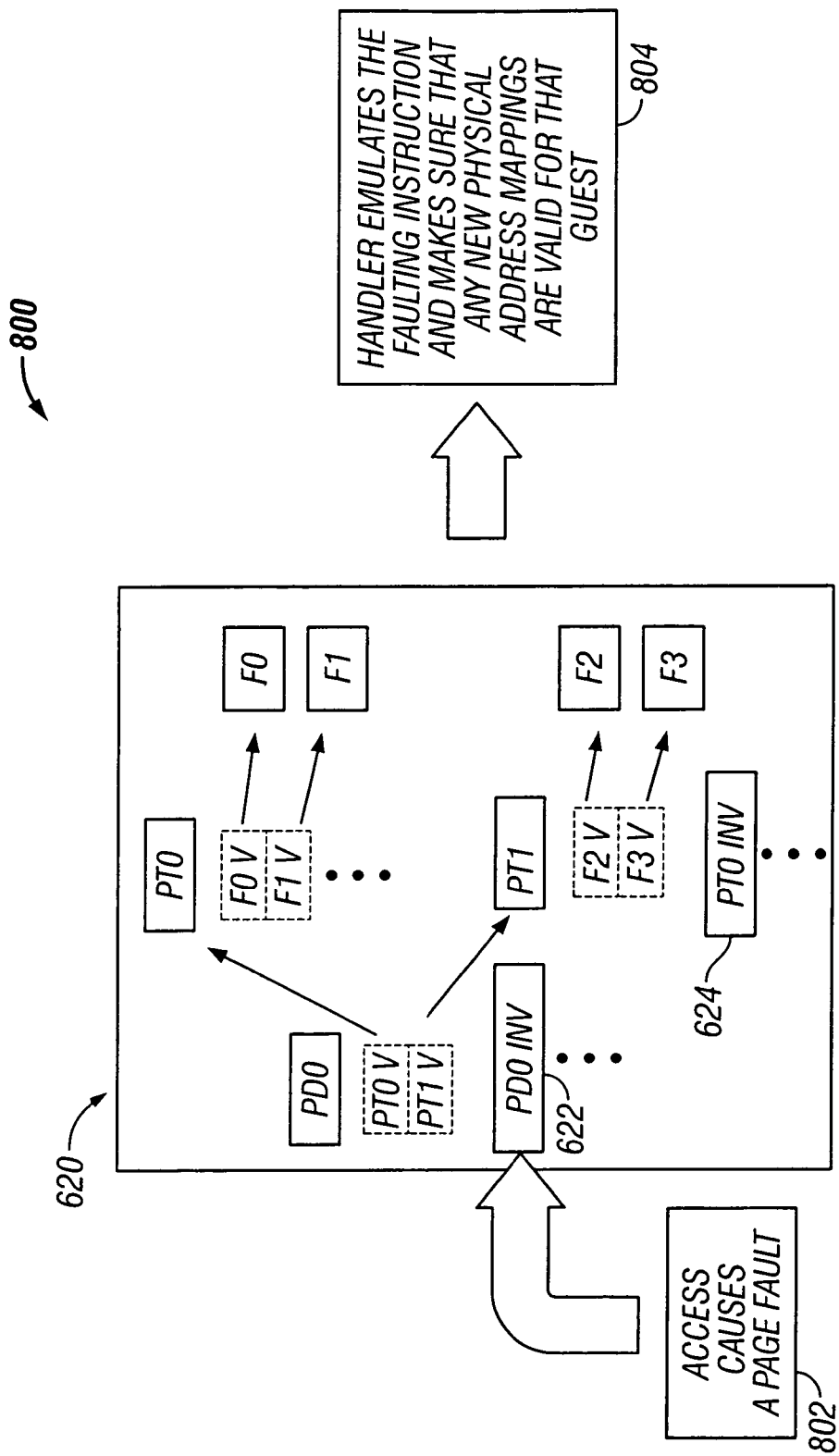
FIG. 8 shows a block diagram illustrating an example of a guest page table hierarchy undergoing the process associated with the enforcement phase utilizing the page fault handler.

As shown in FIG. 8, an access from the guest OS to access the page directory page or page table in the guest page table hierarchy causes a page fault (block 802). The virtual machine monitor 204 implementing the page fault handler emulates the faulting instruction and makes sure that the new physical address mappings as set forth in page table hierarchy 800 are valid for the guest (block 804).

Further, if the virtual machine monitor's 204 view of the physical memory, for some reason, does not coincide with the guest's view of the physical memory, then the virtual machine monitor may need to provide additional support for virtualizing the guest memory. This may be accomplished by modifying the physical frame mappings in the guest page tables during load handling and while handling page faults to provide modifications to the page directory and/or page tables such that they coincide with that of the guest's. The virtual machine monitor will be trapped on all read accesses to the page tables and then can present the correct page table entries to the guest.

It should be appreciated that the previously described implementation of the virtual machine monitor, and the associated processes implemented by the virtual machine monitor, are advantageous in that the virtual machine monitor only needs to control edits to page tables and page directories, whereas all other accesses can be handled by the guest directly. Further, the use of shadow page tables are not required resulting in reduced memory requirements.

While embodiments of the present invention and its various functional components have been described in particular embodiments, it should be appreciated that the embodiments of the present invention can be implemented in hardware, software, firmware, middleware or a combination thereof and utilized in systems, subsystems, components, or sub-components thereof. When implemented in software or firmware, the elements of the present invention are the instructions/code segments to perform the necessary tasks. The program or code segments can be stored in a machine readable medium (e.g. a processor readable medium or a computer program product), or transmitted by a computer data signal embodied in a carrier wave, or a signal modulated by a carrier, over a transmission medium or communication link. The machine-readable medium may include any medium that can store or transfer information in a form readable and executable by a machine (e.g. a processor, a computer, etc.). Examples of the machine-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, bar codes, etc. The code segments may be downloaded via networks such as the Internet, Intranet, etc.

Further, while embodiments of the invention have been described with reference to illustrative embodiments, these descriptions are not intended to be construed in a limiting sense. Various modifications of the illustrative embodiments, as well as other embodiments of the invention, which are apparent to persons skilled in the art to which embodiments of the invention pertain, are deemed to lie within the spirit and scope of the invention.

What is claimed is:

1. An apparatus comprising:
   a processor having a normal execution mode and a protected execution mode; and
   a virtual machine monitor (VMM) operable in conjunction with either the protected execution mode of the processor or the normal execution mode of the processor, the virtual machine monitor operating in an area of protected memory, the virtual machine monitor to control access to a page table hierarchy by a guest operating system (OS), the guest operating system operating as part of a virtual machine, the guest OS through the VMM to manage memory address access for a plurality of virtual machines;
   wherein the virtual machine monitor obtains control of memory access transactions responsive to the guest operating system attempting to access the page table hierarchy and stores information related to the page table hierarchy;
   wherein the virtual machine monitor includes a load handler to set invalid flags for page tables in the page table hierarchy, and to create a list of modified page table, and when the guest operating system attempts to access the list of the modified page table, control of memory access transactions is transferred to the virtual machine monitor;
   wherein the virtual machine monitor stores information related to the page table hierarchy including a listing of page tables and virtual page frame numbers corresponding to the list of the modified page table; and
   wherein the virtual machine monitor utilizing a page fault handler, determines whether a faulting linear frame number matches one of a plurality of linear frame numbers of the list of modified page table, and if so, the virtual machine monitor emulates a requested instruction on behalf of the guest operating system.

2. A method comprising:
   providing a normal execution mode and a protected execution mode in a processor;
   while operating in either the protected execution mode of the processor or the normal execution mode of the processor, controlling access to a page table hierarchy by a guest operating system (OS) including obtaining control of memory access transactions responsive to the guest operating system attempting to access the page table hierarchy, wherein the guest operating system operates as part of a virtual machine and wherein the guest OS through the virtual machine monitor (VMM) manages memory address access for a plurality of virtual machines;

storing information related to the page table hierarchy; and setting invalid flags for page tables in the page table hierarchy, and to create a list of a modified page table;

wherein, when the guest operating system attempts to access the list of the modified page table, control of memory access transactions is transferred to a virtual machine monitor, the virtual machine monitor operating in an area of protected memory;

storing information related to the page table hierarchy including a listing of page tables and virtual page frame numbers corresponding to the list of the modified page table; and determining whether a faulting linear frame number matches one of a plurality of linear frame numbers of the list of the modified page table, and if so, emulating a requested instruction on behalf of the guest operating system.

3. A machine-readable medium having stored thereon instructions, which when executed by a machine, cause the machine to perform the following operations comprising:

providing a normal execution mode and a protected execution mode in a processor;

while operating in either the protected execution mode of the processor or the normal execution mode of the processor, controlling access to a page table hierarchy by a guest operating system (OS), the guest operating system operating as part of a virtual machine and wherein the guest OS through the (virtual machine monitor) VMM manages memory address access for a plurality of virtual machines;

storing information related to the page table hierarchy; and setting invalid flags for page tables in the page table hierarchy, and to create a list of a modified page table;

wherein, when the guest operating system attempts to access a the list of the modified page table, control of memory access transactions is transferred to a virtual machine monitor, the virtual machine monitor operating in an area of protected memory;

wherein the instructions cause the machine to perform further operations comprising storing information related to the page table hierarchy including a listing of page tables and virtual page frame numbers corresponding to the list of the modified page table ;and wherein the instructions cause the machine to perform further operations comprising determining whether a faulting linear frame number matches one of a plurality of linear frame numbers of the list of the modified page table, and if so, emulating a requested instruction on behalf of the quest operating system.

4. A system comprising:

a processor including virtual machine extension (VMX) instruction support to implement virtual machines, the processor having a normal execution mode or a protected execution mode;

a virtual machine monitor (VMM) operable in conjunction with either the protected execution mode of the processor or the normal execution mode of the processor, the virtual machine monitor operating in an area of protected memory, the virtual machine monitor to control access to a page table hierarchy by a guest operating system (OS), the guest operating system operating as part of a virtual machine;

wherein the virtual machine monitor obtains control of memory access transactions responsive to the guest operating system attempting to access the page table hierarchy and stores information related to the page table hierarchy, the guest OS through the VMM to manage memory address access for a plurality of virtual machines; and wherein the virtual machine monitor includes a load handler to set invalid flags for page tables in the page table hierarchy, and to create a list of a modified page table, and when the guest operating system attempts to access the list of the modified page table, control of memory access transactions is transferred to the virtual machine monitor;

wherein the virtual machine monitor stores information related to the page table hierarchy including a listing of page tables and virtual page frame numbers corresponding to the list of the modified page tables; and wherein the virtual machine monitor utilizing a page fault handler, determines whether a faulting linear frame number matches one of the linear frame numbers of the list of the modified page table, and if so, the virtual machine monitor emulates a requested instruction on behalf of the guest operating system.

* * * * *